United States Patent [19]

Durham et al.

[11] Patent Number: 5,137,568
[45] Date of Patent: Aug. 11, 1992

[54] ORGANOKAOLIN PIGMENTS IN INK FORMULATIONS

[75] Inventors: David H. Durham, Macon, Ga.; Michael Pugliese, Edison, N.J.

[73] Assignee: J.M. Huber Corporation, Rumson, N.J.

[21] Appl. No.: 702,118

[22] Filed: May 16, 1991

Related U.S. Application Data

[63] Continuation of Ser. No. 347,622, May 2, 1989, abandoned.

[51] Int. Cl.$^5$ ............................................. C02D 11/02
[52] U.S. Cl. ......................................... 106/20; 106/486; 106/487; 106/468
[58] Field of Search .................. 106/23, 486, 487, 468; 501/148

[56] References Cited

U.S. PATENT DOCUMENTS

| | | | |
|---|---|---|---|
| 1,755,616 | 5/1927 | Vanderbilt | 8/523 |
| 1,841,309 | 4/1930 | Vanderbilt | 8/523 |
| 3,151,993 | 10/1964 | Bundy | 106/20 |
| 3,597,304 | 8/1971 | Baldwin et al. | 8/625 |
| 3,934,973 | 1/1976 | Shultz et al. | 8/524 |
| 3,963,511 | 6/1976 | Swift et al. | 106/486 |
| 3,974,125 | 8/1976 | Oswald et al. | 523/216 |
| 3,996,179 | 12/1976 | Haus et al. | 106/22 |
| 4,078,941 | 3/1978 | Bundy et al. | 106/487 |
| 4,106,949 | 8/1978 | Malden | 106/486 |
| 4,193,806 | 3/1980 | Finlayson | 106/22 |
| 4,197,222 | 4/1980 | Wegman | 106/22 |
| 4,317,737 | 3/1982 | Oswald et al. | 252/28 |
| 4,365,030 | 12/1982 | Oswald et al. | 523/508 |
| 4,412,018 | 10/1983 | Finlayson et al. | 106/287.25 |
| 4,434,075 | 2/1984 | Mardis et al. | 106/27 |
| 4,475,950 | 10/1984 | Finlayson | 106/23 |
| 4,517,112 | 5/1985 | Mardis et al. | 106/27 |
| 4,623,398 | 11/1986 | Goodman et al. | 106/468 |
| 4,631,091 | 12/1986 | Goodman | 106/468 |
| 4,683,259 | 7/1987 | Goodman | 106/487 |
| 4,738,726 | 4/1988 | Pratt et al. | 106/487 |
| 4,743,305 | 5/1988 | Doidge et al. | 106/487 |
| 4,743,306 | 5/1988 | Jepson et al. | 106/468 |
| 4,752,342 | 6/1988 | Tatum et al. | 106/468 |
| 4,767,466 | 8/1988 | Nemeh et al. | 106/487 |

Primary Examiner—William R. Dixon, Jr.
Assistant Examiner—Helene Klemanski
Attorney, Agent, or Firm—Harold H. Flanders; Alec H. Horn; Robert L. Price

[57] ABSTRACT

Dispersibility of extender pigments in ink formulations is improved by using as the extender pigment, a quaternary ammonium treated kaolin clay.

16 Claims, No Drawings

ORGANOKAOLIN PIGMENTS IN INK FORMULATIONS

This application is a continuation of application Ser. No. 07/347,622, filed May 2, 1989, now abandoned.

TECHNICAL FIELD

This invention relates to ink formulations and more particularly relates to the incorporation into inks of kaolin clay quaternary amine reaction products as extender pigments which enhance the end use properties of printing inks.

BACKGROUND ART

It is known to treat kaolin clays with quaternary amines to form quaternary clay gellants as shown, for example, in U.S. Pat. No. 3,974,125. Such clay gellants are taught to be useful for incorporation into polyester as a pre-gel for the unsaturated polyester. Similar disclosures may be found in U.S. Pat. Nos. 4,317,737 and 4,365,030.

It is also known to improve the dispersibility of smectite clays by reaction of a smectite clay with a quaternary ammonium compound These products are disclosed as being useful as thixotropic agents in organic media such as lubricating greases, oil based drilling fluids, paints, varnishes, enamels and printing inks. These disclosures may be found in U.S. Pat. Nos. 4,743,305, 4,743,306, 4,623,398, 4,631,091, and 4,683,259. The problem disclosed in these patents for use of the smectite quaternary ammonium reaction products is to overcome problems in dispersibility in an organic medium whereby the surface of the clay is rendered hydrophobic by the cation exchange reaction.

There is also a need in the art to improve the dispersibility of organic solvents/oil based inks and in particular to improve such dispersibility with less shear. The present invention therefore satisfies a number of needs in the ink formulation art.

DISCLOSURE OF THE INVENTION

It is accordingly one object of the present invention to provide a kaolin clay/quaternary amine reaction product and methods for its incorporation into ink formulations.

A further object of the invention is to provide printing inks in which dispersibility is improved by incorporation of certain kaolin clay/quaternary amine reaction products into the ink as extender pigments.

A further object of the present invention is to improve the dispersibility of printing inks and improvements in dispersibility of extender pigment organokaolin products in organic solvents and oils.

Other objects and advantages of the present invention will become apparent as the description thereof proceeds.

In satisfaction of the foregoing objects and advantages, there is provided by this invention an ink composition comprising a dispersion of:
(a) an organic solvent;
(b) an oil based ink; and
(c) an extender pigment comprising the reaction product of a kaolin clay and a quaternary ammonium compound.

The present invention also provides a method for improving the dispersion characteristics of organic solvent based inks which comprises incorporation into said ink formulation, the reaction product of a kaolin clay and a quaternary ammonium compound.

The present invention also provides novel offset ink formulations or letterpress ink formulations comprising an organic solvent, an oil based ink, and 3-25 wt% of the reaction product of a kaolin clay and a quaternary ammonium compound.

The present invention also provides a rotogravure ink formulation comprising toluene, an ink oil base, and 3-25% of the reaction product of a kaolin clay and a quaternary ammonium compound.

BEST MODE FOR CARRYING OUT THE INVENTION

It has been discovered according to the present invention that kaolin clays which have been treated with quaternary amines produce organokaolin products which require less pulverization for a given degree of dispersion in organic solvents or oils than competitive non-reacted clays. The organokaolin products are more compatible with organic solvents and oils than untreated clays. Ease of use and end use properties are enhanced due to greater compatibility in these systems.

While it is known that hydrophilic smectites can be converted to organophilic smectites by treatment with quaternary ammonium compounds, it is unexpected that kaolin clays could be rendered more dispersible in ink formulations by treatment with quaternary ammonium compounds in accordance with the present invention.

The reaction products of kaolin clays and quaternary ammonium compounds are organophilic. It has been discovered that when these products are incorporated into organic solvents/oil based inks, an improved dispersion results yielding improved NPIRI grind values with less shear. Thus these products show utility in inks involving organic solvents and oils. In addition, the reaction products require less energy per grinding due to the treatment, thus facilitating a more efficient pulverization. Less energy is required to disperse the clays in the inks and ink properties are improved. The clay transfer to lithographic fountain solutions as well as fountain solution transfers to inks are substantially eliminated.

Letter press and offset color news ink are generally formulated with various amounts of an extender pigment which is necessary to achieve the rheological requirements of the process. Clays are often used for this purpose since they are low in cost and have the ability of decreasing the misting and slinging of the inks when printed at high speeds. The amount of clay used in such applications varies from about 2-10 wt% for letter press color inks and from 10-25 wt% for web offset color inks.

The incorporation of clay into the manufacture of inks and the larger content of clay required in web offset inks cause two basic problems. First, the clay presents difficulty in dispersing itself in the ink if the ink is manufactured using high speed mixing without roller milling. In fact, since the ink makers in the United States use pigment flushes, no need for a costly roll mill operation exists if the extender pigment can also be dispersed by simple high speed mixing. However, clays have a hydrophilic surface and consequently are very difficult to be wetted and dispersed by hydrocarbon vehicles such as mineral oils and corresponding varnishes. In addition, dispersions of conventional clays and hydrocarbon vehicles are not very stable on aging, and some agglomeration of clay particles occurs. The second problem occurs during printing of lithographic inks (offset news inks) whereby the clay in the ink is leached by the fountain solution and slowly migrates in it. Evidently, the hydrophilicity of the clays is such that the clay is extracted from the ink and goes into the water together with traces of color pigments. This causes a bleeding problem and in addition, the presence of clay in the fountain solution causes a variety of printability problems resulting in inadequate reproduction of colors.

A primary object of the present invention is to provide a pigment extender which can be easily wetted, dispersed and incorporated in color news inks with a simple mixing operation without the need of roller milling or shot milling. The present invention also provides an extender pigment which is very effective in reducing misting and slinging of news inks when printed on high-speed presses. The present invention further provides an extender pigment produced from kaolin clay to be used in lithographic inks, which pigment is very effective in increasing ink viscosity in order to adjust the rheological properties of the inks. The present invention also provides a pigment extender based on kaolin clay for lithographic inks which wets very easily with the hydrocarbon vehicles and cannot be leached by the fountain solutions.

The pigment extenders in the present invention are produced as reaction products of quaternary amines and clays. Any suitable clay basic material may be used including kaolin, bentonite, montmorillonite, synthetic layered silicates such as Laponites, hectorites, and including clays which have high ion exchange capacities, as well as analogous aluminosilicate compositions which would be functionally equivalent. However, the preferred embodiment of the present invention is to use good quality kaolin clays and particularly kaolinite.

The kaolin clay is reacted with or treated with quaternary amines to provide the extender pigment of the present invention. Quaternary amines which may be used include those generally represented by the formula

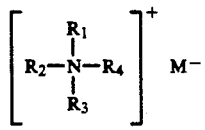

wherein the R groups are organic groups and M is an anion, most preferably a halide such as chloride or sulfate. In the preferred compounds, however, $R_1$, $R_2$, $R_3$ and $R_4$ are lower alkyl groups or aryl groups such as phenyl. Preferred compounds are those wherein at least two of the $R_1$, $R_2$, $R_3$ and $R_4$ substituents are lower alkyl of 1 to 7 carbon atoms, preferably methyl, and the other two of said groups are longer chain alkyl radicals up to 20 carbon atoms. The alkyl groups may also contain hydroxy substituents. A preferred group of quaternary ammonium reactants are those sold under the tradename Arquad, such as Arquad 12-50, Arquad B-100, and Arquad 2HT. It is also preferred that the quaternary ammonium chemical compound be a water-soluble polyquaternary ammonium salt polymer which has a molecular weight ranging from 100 to 1 million. For some systems, a polyquat polymer having a molecular weight range of 1000-3000 is preferred. For other systems, a polyquat polymer of molecular weight 10,000 to 100,000 or an average of about 50,000, was preferred.

All of these quaternary ammonium reactants are commercially available and well known in the art.

The kaolin clay/quaternary ammonium reaction product is produced by initially forming a kaolin slurry by mixing an acid dried clay in water at a solids content of about 50-80 wt% in the presence of a conventional dispersant with good agitation in order to obtain good suspending qualities. A suspension of the quaternary amine is then formed and added to the kaolin slurry and the mixture is continued to be mixed for from 20 minutes to 1 hour. Water may be added as needed to provide good mixing. The amount of quaternary amine added is a generally stoichiometric equivalent or up to 5 meg. in excess. The reaction temperature during this mixing procedure may range from 30°-70° C. After the mixing procedure is completed, the product which forms is filtered, rinsed with water and dried to a low moisture content such as 1-2% moisture. The dried product may then be milled to reduce to fine particle size.

The treated clay produced according to this process is useful as an extender pigment in printing inks. In particular, the treated clay of this invention may be used in news inks of all types with advantageous results over current procedures. Thus, in letter press inks, the treated clay may be incorporated in amounts ranging from 2 wt% to 10 wt% with excellent results. In offset or lithographic inks, it is preferred that the amount of treated clay present be in the range of about 3-25%. Inks of this type comprise an ink oil base, an organic solvent and the treated clay extender pigment of this invention, together with the ink pigment.

The extender pigments of the invention may also be used with rotogravure inks which are toluene based inks. Normally extender pigments such as untreated clay will not disperse well in toluene. In the present invention, however, the treated clay appears to make the clay more dispersible in the toluene as it becomes dispersible much in the same manner as the solvent of the ink.

It is theorized that the treated clay of the present invention causes the clay to become more hydrophobic and therefore more easily dispersible in the various ink formulations.

The following examples are presented to illustrate the invention but it is not to be considered as limited thereto. In the examples and throughout the specification, parts are by weight unless otherwise indicated.

EXAMPLE 1

In this example, kaolinite clay was modified by treatment with 3 milliequivalents of Arquad 2HT-75, a commercial quaternary ammonium reagent. This clay was then used in the following examples for incorporation into ink.

EXAMPLE 2

A process red web offset ink, Adlitho 72, was prepared as follows:
21 g of a lithol rubine flushed pigment, 25 g of varnish composed of 60% Nevchem 140 hydrocarbon resin and 40% of Magiesol 52 solvent, 18 g of treated clay and 36 g of a blend of mineral oils were added into a 200 cc glass jar. The ingredients were mixed together for 20 minutes using a laboratory mixer. The resulting ink was tested on the NPIRI grindometer, and showed a scratch reading of zero, and a speckles reading of 4, thus indicating excellent dispersion. The ink viscosity, measured on the Brookfield viscometer was found to be 180 poises at 25° C. This ink was tested on the Duke tester for water pick-up using rycoline 4088 C alkaline fountain solution at a pH of 10 and conductivity of 1200; the water pick-up was found to be 70% and the decanted water contained no traces of clay.

A similar ink made with a conventional non-treated clay (Huber clay 80) under the same manufacturing conditions required 22 g of clay. Its grindometer reading was 5 for scratches and 18 for speckles. Its water pick-up was 82% and the water decanted from the Duke tester contained a considerable amount of clay tinted by the red pigment.

EXAMPLE 3

A process yellow web offset ink, Adlitho 73, was prepared by mixing 41 g of an AAA benzidine yellow flush, 20 g of the hydrocarbon varnish used in Example 2, 12 g of treated clay and 27 g of a blend of mineral oils. After 15 minutes of mixing with a laboratory mixer, the resulting ink had a Brookfield viscosity of 200 poises at 25° C., a grindometer reading of zero scratches and 4 speckles, and a Duke water pick-up of 92%. The water decanted from the Duke tester was very clear with no traces of clay or of color.

EXAMPLE 4

A process blue web offset news ink was prepared by mixing for 25 minutes with a laboratory mixer 24 g of a phthalocyanine blue flush, 17 g of a hydrocarbon varnish, 15 g of a treated clay, and 44 g of a blend of mineral oils. The resulting ink had a grindometer reading of zero scratches and 6 speckles, a Brookfield viscosity of 175 poises at 25° C., and a Duke water pick-up of 65%. The alkaline fountain solution decanted from the Duke tester was very clean and showed no presence of clay.

EXAMPLE 5

200 pounds of the ink of Example 2 were prepared in the pilot plant using the same composition of Example 2 and by mixing for 30 minutes with Cowles dissolvers. The resulting ink reproduced exactly the physical, rheological and lithographic properties of the ink of Example 2. The ink was then tested on a commercial press at a speed of 45,000 IPH. It performed very well, and the test did not show any trace of clay in the fountain solution after two hours of printing.

The invention has been described with reference to certain preferred embodiments. However, as obvious variations thereon will become apparent to those skilled in the art, the invention is not to be considered as limited thereto.

We claim:

1. An ink composition containing an ink pigment, an organic base, an ink oil, and from 2-25 wt% of a quaternary ammonium treated extender kaolin clay pigment.

2. A composition according to claim 1 which contains from 3-25% by weight of said quaternary ammonium treated kaolin clay extender pigment.

3. A composition according to claim 1 which is an offset ink which contains ink pigment, ink oil, an organic solvent, and quaternary ammonium treated kaolin clay in an amount of 3-25% by weight.

4. A composition according to claim 1 which is a letter press color ink which contains ink pigment, ink oil, organic solvent, and 2-10 wt% of quaternary ammonium treated kaolin clay.

5. A composition according to claim 1 which is a rotogravure composition which contains ink pigment, ink oil, toluene solvent, and quaternary ammonium treated kaolin clay.

6. A composition according to claim 1 wherein the quaternary ammonium treated extenders kaolin clay pigment is prepared by the reaction of kaolin clay with a quaternary ammonium compound of the formula:

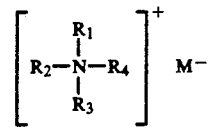

wherein $R_1$, $R_2$, $R_3$ and $R_4$ are alkyl, hydroxyalkyl, or aryl and M is an anion.

7. A composition according to claim 6 wherein the reaction is carried out in an aqueous medium at a temperature of 30° to 70° C.

8. A composition according to claim 6 wherein the kaolin clay is kaolinite.

9. A method for improving the dispersibility of the components in an ink formulation which comprises incorporation into said ink formulation of a quaternary ammonium treated kaolin clay as an extender pigment in an amount of 3-25% by weight.

10. A method according to claim 9 wherein the formulation contains an ink pigment, an organic solvent, an ink oil, and 3-25% by weight of said quaternary ammonium treated extender kaolin clay pigment.

11. A method according to claim 9 wherein said formulation is an offset ink which contains ink pigment, ink oil, an organic solvent, and said quaternary ammonium treated kaolin clay in an amount of 3-25% by weight.

12. A method according to claim 9 wherein said formulation is a letter press color ink which contains ink pigment, ink oil, organic solvent, and 2-10 wt% of quaternary ammonium treated kaolin clay.

13. A method according to claim 9 wherein said formulation is a rotogravure composition which contains ink pigment, ink oil, toluene solvent, and quaternary ammonium treated kaolin clay.

14. A method according to claim 9 wherein the quaternary ammonium treated extenders kaolin clay pigment is prepared by the reaction of kaolin clay with a quaternary ammonium compound of the formula:

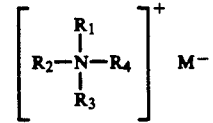

wherein $R_1$, $R_2$, $R_3$ and $R_4$ are alkyl, hydroxyalkyl, or aryl and M is an anion.

15. A method according to claim 14 wherein the reaction is carried out in an aqueous medium at a temperature of 30° to 70° C.

16. A method according to claim 9 wherein the kaolin clay is kaolinite.

* * * * *